United States Patent [19]

Zaffignani et al.

[11] 4,144,407
[45] Mar. 13, 1979

[54] MULTIPROCESSOR SYSTEM FOR AUTOMATIC SWITCHING OF TELEGRAPHIC LINES

[75] Inventors: Giovanni Zaffignani, Ivrea; Carlo Casalino, Chivasso (Turin), both of Italy

[73] Assignee: Ing. C. Olivetti & C., S.p.A., Ivrea (Turin), Italy

[21] Appl. No.: 846,106

[22] Filed: Oct. 27, 1977

[30] Foreign Application Priority Data

Nov. 12, 1976 [IT] Italy ................................ 69701 A/76

[51] Int. Cl.² .......................... H04J 3/06; H04Q 3/54
[52] U.S. Cl. ................................ 178/50; 179/15 BA;
179/18 ES
[58] Field of Search ............................ 178/50, 2 R, 3;
179/15 BA, 15 A, 15 AT, 18 ES

[56] References Cited

U.S. PATENT DOCUMENTS

| | | | |
|---|---|---|---|
| Re. 29,215 | 5/1977 | Carney et al. ...................... | 178/50 X |
| 3,974,343 | 8/1976 | Cheney et al. .................. | 179/18 ES |
| 4,074,072 | 2/1978 | Christensen et al. ............ | 179/18 ES |

*Primary Examiner*—Thomas A. Robinson
*Attorney, Agent, or Firm*—Schuyler, Birch, Swindler, McKie & Beckett

[57] ABSTRACT

A new, high capacity switching center for telegraphic lines which employs digital elements is herewith described. The system resembles a multiprocessor with hierarchical organization. The general coordinating functions of the system are carried out by a minicomputer having a main memory and a mass memory. Several high speed microcomputers (known as the multiplex subsystem or multiplexer), each having in turn a local working memory, are interconnected to each other and to the minicomputer through a multiplex channel. Telegraphic lines are connected to each microcomputer. These in turn are linked to users in remote locations. The local memories of the microcomputers include an area reserved for the recording of incoming messages from the connected users and an area for recording the outgoing messages to the connected users. The messages received from one of the various microcomputers are sent to the microcomputer linked with the recipient user by employing the time division multiplex technique (TDM). A preselected microcomputer operates as interface between the multiplex subsystems and the minicomputer. All the components of the system (minicomputer and related peripheral units, the interface microcomputer, multiplex subsystem microcomputers, local working memories and communication channels) are duplicated for fail safe reasons. In other words, if any of the switching center components fails, a back up component is automatically substituted thus guaranteeing operational continuity and no loss of messages during the transfer phase.

18 Claims, 11 Drawing Figures

FIG.1

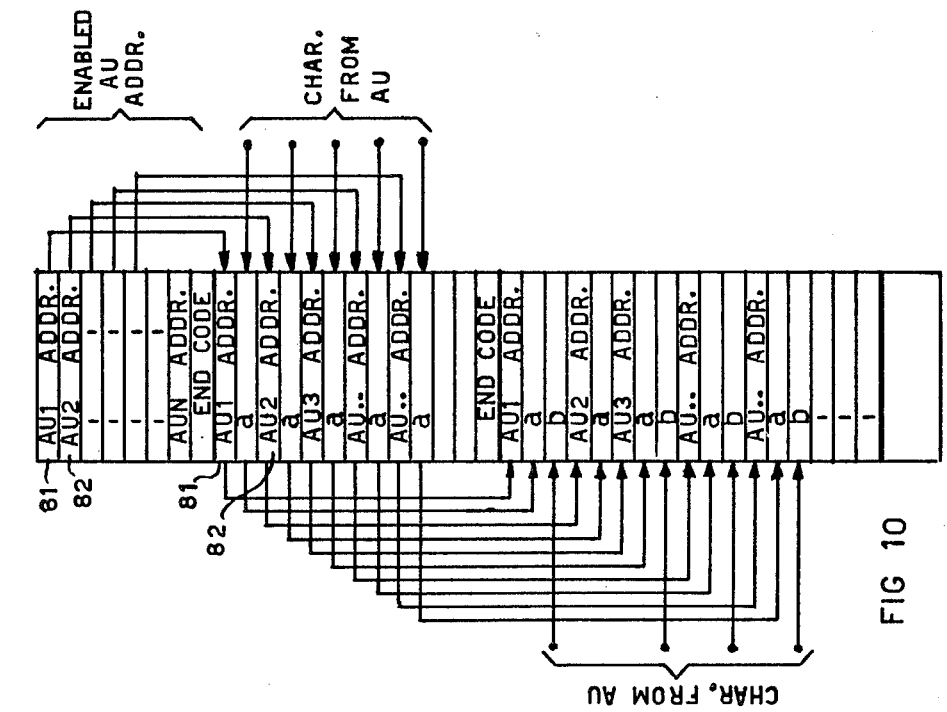
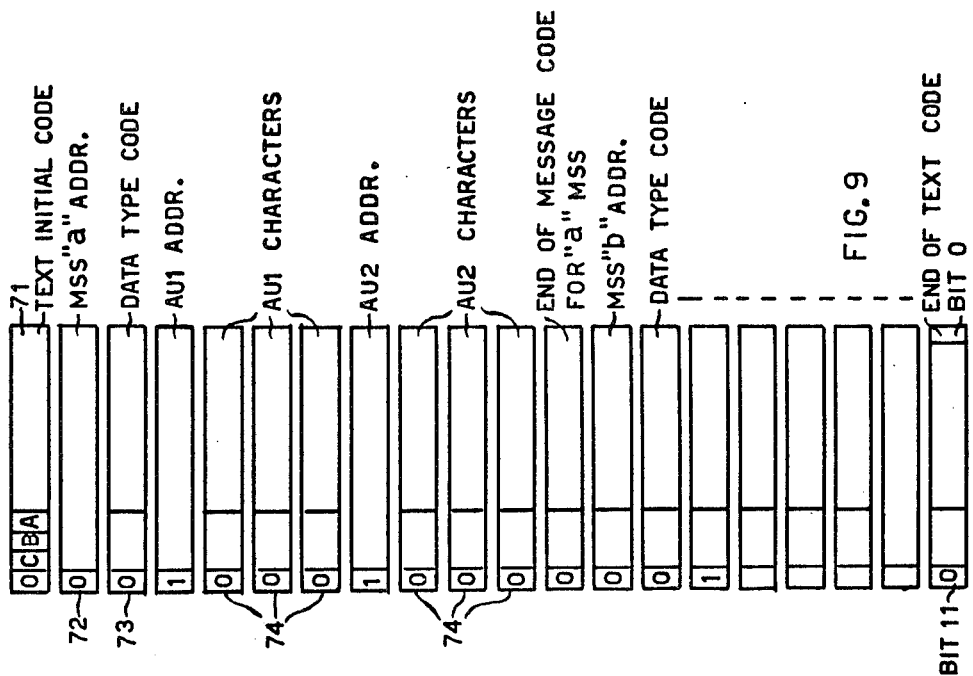
FIG 10
FIG. 9

MULTIPROCESSOR SYSTEM FOR AUTOMATIC SWITCHING OF TELEGRAPHIC LINES

BACKGROUND OF THE INVENTION

The telegraphic lines automatic switching center according to the invention is of the multiprocessor type which makes switching connections between users of telegraphic lines, by the time division multiplex technique (TDM).

A known switching center includes two central processors for program processing, two peripheral unit control processors, two line control processors and two central working memories directly linked (through single buses) to all the system processors. Since all the components of the system are duplicated for increased security, the same operations are carried out in parallel. The disadvantages of this type of switching center occur because of the large number of buses connecting the various processors to the sole working memory of the system. The large number of buses in fact creates the following problems: dispersion problems which necessitate regeneration of the signals carried by the buses themselves; a high degree of central memory management logic complexity, necessitating its division into several banks to be accessed simultaneously; and finally, the requirement that the memory areas associated with different programs being executed on the various processors be protected.

SUMMARY OF THE INVENTION

These disadvantages are obviated by the switching center according to the invention which includes several programable multiplex subsystems or multiplexers, each connected to several telegraphic lines linking users in remote locations; a programable multiplex system; and a multiplex bus serially linking the multiplex system and the multiplex subsystems. The multiplex subsystems use the TDM technique to transmit the remote user's messages, information and control characters over the multiplex bus to other multiplex subsystem without the intervention of the multiplex system. The multiplex system transmits to the multiplex subsystems through the multiplex bus the commands and the data necessary for the functioning of the whole multiprocessor system. The technical advantage of the switching center according to the invention is achieved because of the distributed processing capacity of the system. This entails a programable multiplex system (of minicomputer type) for the management of the system's general functions and several programable multiplex subsystems (of the high processing speed microcomputer type) for the management of the user's communications through the connection bus by the TDM technique. The architecture of this system is made possible by the high processing speed of the microcomputers which are connected to the only available bus. Each microcomputer is capable of sending a large number of characters on the bus in the available time slot.

BRIEF DESCRIPTION OF THE DRAWINGS

Following is a description of the multiprocessor system according to the invention with reference to the attached drawings in which:

FIG. 9 shows the text structure on the multiplex channel;

FIG. 10 shows the data memory organization of the multiplex subsystem of FIG. 2 when receiving the characters originating from the user's connections; and, FIG. 11 shows the data memory organisation of multiplex subsystem of FIG. 2 during the transmission of characters to the user's connections.

DETAILED DESCRIPTION OF THE INVENTION

Figure 1:
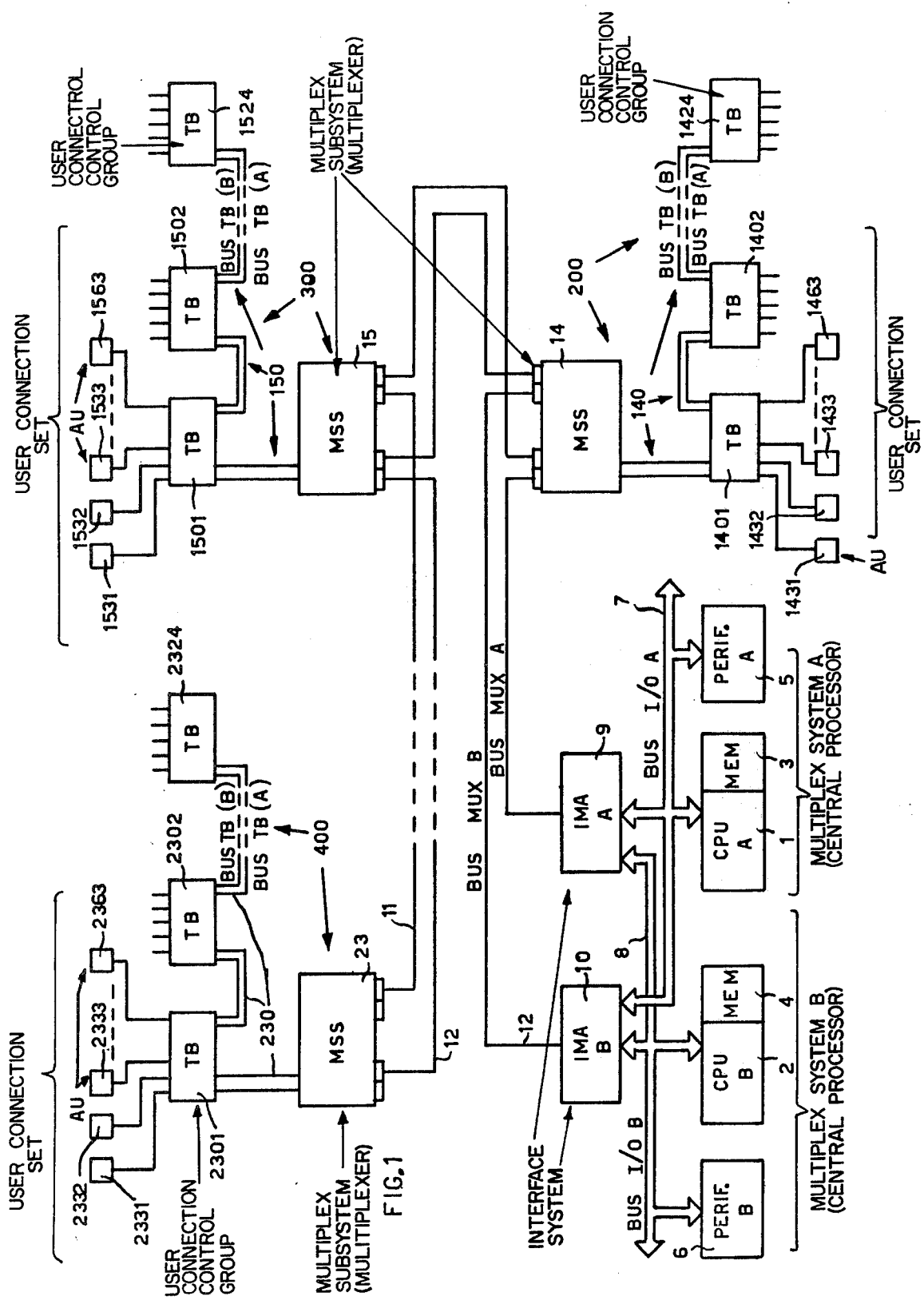
FIG. 1 shows the block diagram of the switching center according to the invention.

The multiplex system of FIG. 1 manages and controls the link network consisting of the user's connection set (AU), the user's bus (BUS-TB) and the multiplex subsystem bus (BUS-MUX). Each multiplex subsystem or (MSS) is equipped with two interfaces: the first controls the user's bus (BUS-TB); the second links the user's multiplex system to the subsystem bus (BUS-MUX). Each MSS multiplexer is capable of controlling up to 768 user's connections sets AU which are linked to each other and central processor 1 or 2 through a bus structure as shown. The linkage between BUS-MUX and the central processor 1 or 2 is carried out through an interface (IMA) which performs the scanning and control functions for the various multiplexers MSS in order to minimize the work of the central processor 1 or 2. Both the multiplexer MSS and the interface IMA of central processors 1 or 2 are microprogramed and formed by bipolar microprocessor circuits (also known as "bit-slice" type microprocessor). The bipolar microprocessor system is designed to obtain a high enough processing speed to allow the direct management of both the user's connection sets AU and the communication between interfaces IMA and multiplexers MSS on BUS-MUX. The operating microprogram is sent directly from the central processor 1 or 2 to the MSS multiplexers and to the IMA interfaces 9 and 10. The use of the IMA interfaces allows the separation of the CPU I/O BUS from the BUS-MUX of the MSS multiplexers. In this way, the communication between all the multiplexers MSS is in a non-processor request mode.

The central processors are a well known type of minicomputer which is not described in detail herein. For example, the minicomputer used in the system of FIG. 1 may use as CPU 1,2 the PDP 11 minicomputer by Digital Equipment Corporation which is described in the publication "Processor Handbook PDP 11/35" reference number EB-02613-750210/20 issued in 1973. Alternatively the HP 21 MX miniprocessor by Hewlett-Packard which is described in the publication number 5952-6563-5k issued in August 1974 may be used. Other similar minicomputers available on the EDP market also may be used. The use of these minicomputers in the architecture of the system shown in FIG. 1 requires a set of programs and microprograms capable of carrying out the described herein functions.

Figure 2:
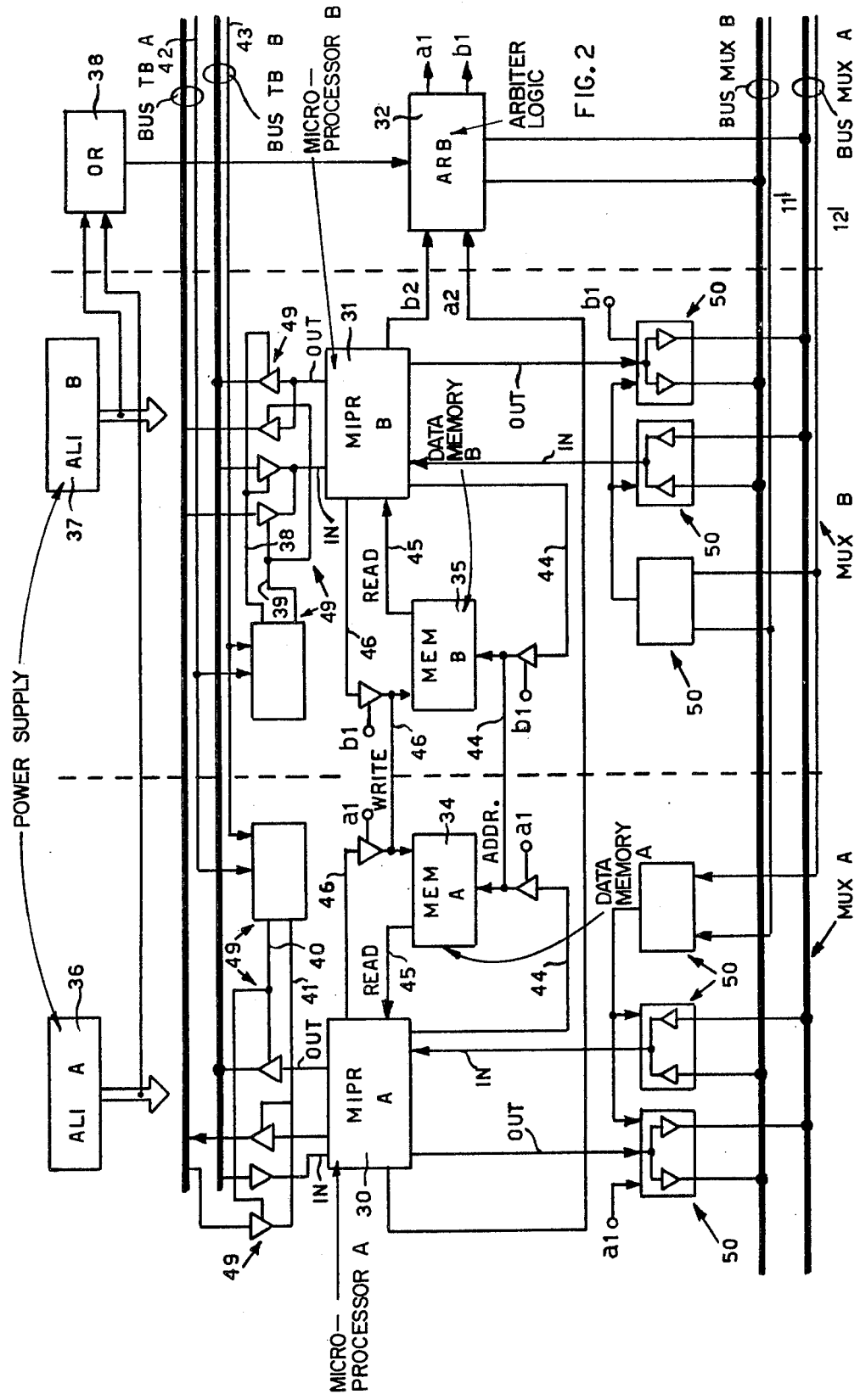
FIG. 2 shows the block diagram of the multiplex subsystem used by the switching center of FIG. 1.

The multiplexer MSS shown in detail in FIG. 2 controls the A, B, C or D type telegraphic procedures capable of linking the users to each other, and the CPU 1, 2. The linking operation including the selection of end link is managed by the multiplexer MSS under the supervision of CPU 1, 2. However, exchange of characters is managed autonomously by the multiplexer MSS. The multiplexer MSS scans the various user connection sets AU and receives or transmits characters which are bufferized in a data memory 34–35. These data memory buffers 34–35 are cyclically unloaded on to either the other multiplexers MSS or the CPU 1–2 through the BUS-MUX. The multiplexer MSS is logically divided into three parts. Two parts as indicated by the vertical dotted lines in FIG. 2 are identical. These two parts represent the real MSS multiplexer circuitry which is doubled for security reasons. The third part of the multiplexer MSS is formed by circuits of the arbiter 32. The arbiter 32 controls the efficiency of the multiplexer and selects one or the other of the first two parts in case of failure. The three parts will be known as MUX A, MUX B and ARB 32 (FIG. 2) respectively. Only one of the MUX A and MUX B units is active at any one time. The other one is in the standby condition.

The two data memories, 34 of MUX A and 35 of MUX B, are linked in such a way that no matter which of the multiplexers (MUX A or MUX B) is active, both are simultaneously updated. Each MUX has its own independent power supply 36 and 37. The al and bl signals generated by the arbiter 32 enable the connection of the active MUX to the external buses (BUS-MUX, BUS-TB). The BUS-TB is activated by providing a signal to the wires 42 and 43. In order to activate the BUS-MUX, it is necessary to detect which of the two buses is operative; this detection is carried out by an appropriate signal on the bus emitted by the IMA interface.

Interfaces 9 and 10 have the task of directing the operation of the various MSS multiplexers 14, 15 and 23 and of carrying out the direct linkage (in D.M.A.) of the central processor 1 or 2 with the memory 3 or 4 respectively. The interfaces IMA are essentially peripheral units of central processors 1 and, 2 and as such, through an input/output system, they receive parameters and commands and return results and status of the central processor. The interfaces 9 and 10 its main function is that of cyclically scan the various multiplexers 14–23 and the central processors 1 and 2 including memories 3 and 4 in order to allow each system unit to exchange processing data with other units. The complete procedure is initialized by the IMA interfaces 9 and 10 under the control of the central processor. The block diagram for the IMA interfaces 9 and 10 is the same as the block diagram of multiplexers MSS 14–23 shown in FIG. 2. The primary difference in hardware is the substitution an interface with the I/O bus of the central processors 1 and 2 for the BUS-TB shown in FIG. 2. However, from the programing point of view, the block diagrams for the interface IMA and multiplexers MSS are completely different.

The user's connection set AU (FIG. 3) constitutes the electric interface with the user's line and carries out the following functions: electric separation between line circuits and the switching center's internal components; line control (single current and double curent); management of the incoming modulation with a 47% greater margin; transmission with a distortion less than 0.5%.

Figure 3:
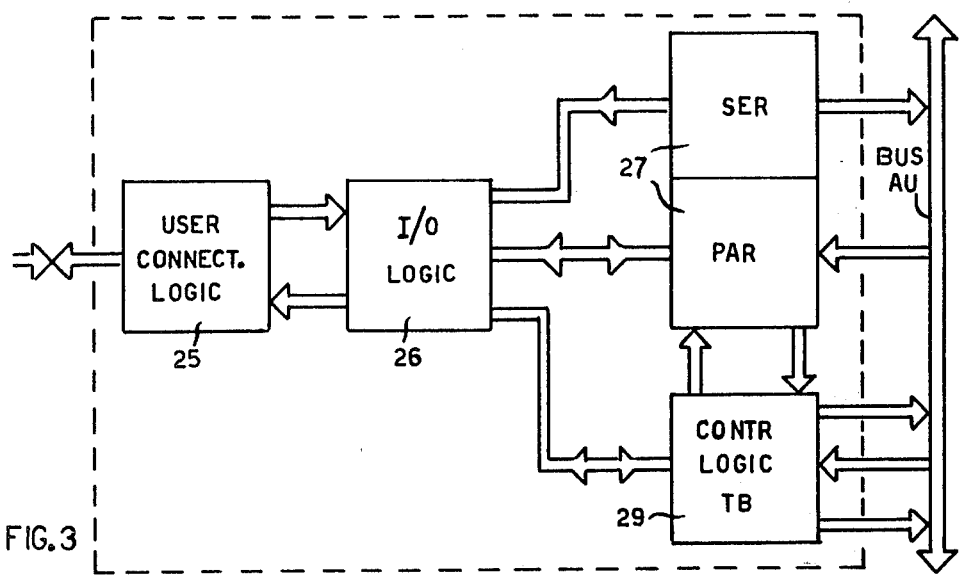
FIG. 3 shows the block diagram of the logic of the user's connections.

As shown in FIG. 3, electric separation is carried out by the electric interface 25 which takes care of the electrical conversion of the signals from telegraphic to logic level and of the management of the line conditions, that is, single or double current in the 2 or 4 wire version. The control logic 29 sets the required signalling conditions: CCITT A and B type and any other required signal. An output of the serial/parallel converter 27 receives an asynchronous serial modulation signal having start and stop bits. The serial/parallel converter 27 transfers characters in 5 or 8 level parallel format to one of the MSS multiplexers 14–23 which will manage it and send it to central processors 1–2. The parallel/serial converter 27 receives characters in parallel format from MSS multiplex 14–23 and sends them in serial format to the user or the connection line, adding the appropriate start and stop bits. The converters are controlled by the program of the multiplexers MSS and may be adapted to the various requirements of the line control. The control logic 29 manages the timing and telegraphic clocks, the command codes and the selection signals.

The user connection control groups TB (1401–1424, 1501–1524, 2301–2324) of FIG. 1 carry out the following main functions:

provide user connection bus interface (BUS-AU in FIG. 3 not shown in FIG. 1);

addresses the signals originating from the microprocessor MIPR 30, 31 of multiplexer MSS 14–23 and bound to the user of the work telegraphic frequencies of each line;

generates the work telegraphic frequencies of each line.

Figure 4:
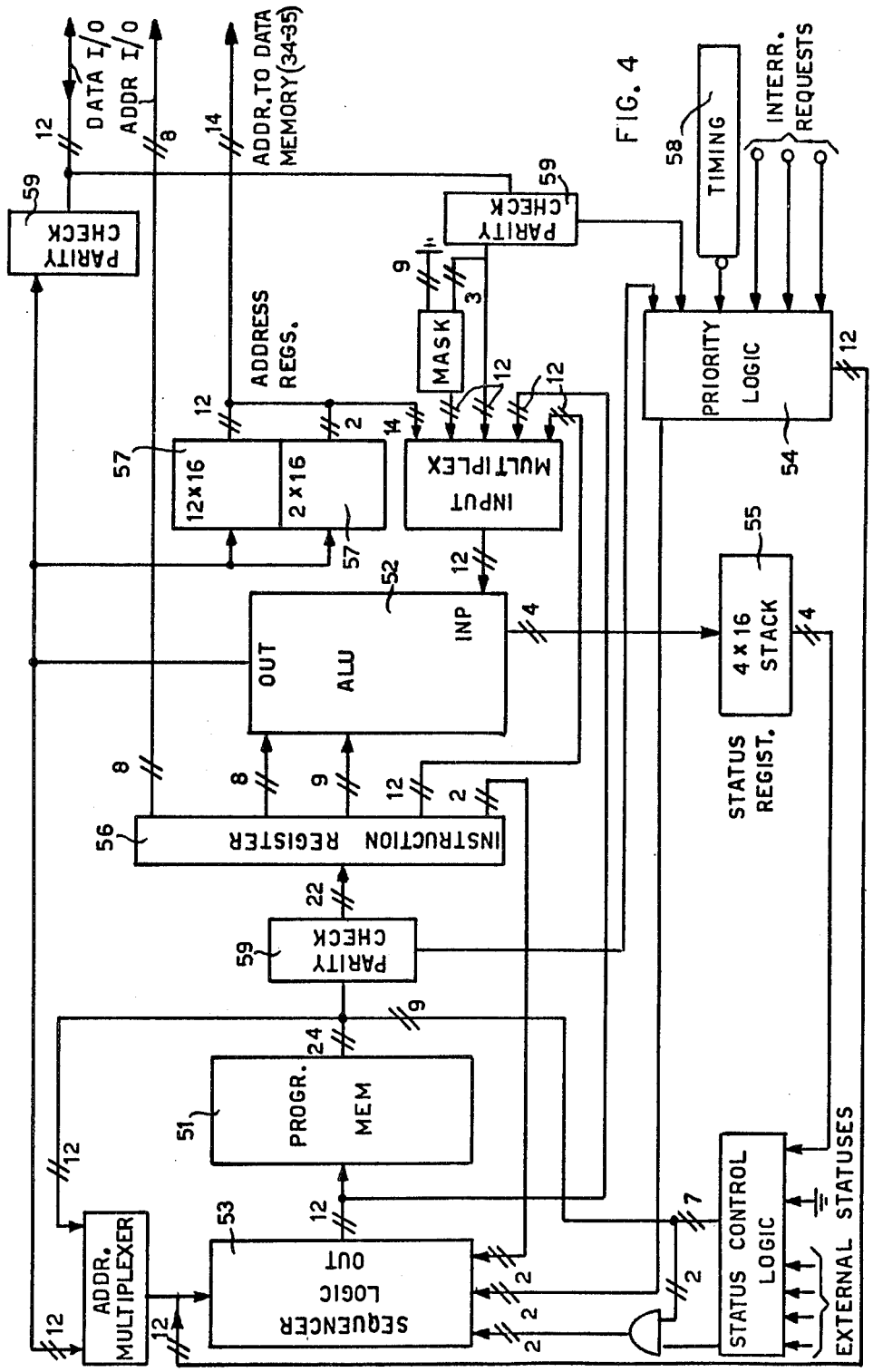
FIG. 4 shows the block diagram of the central unit used in the multiplex subsystem of FIG. 2.
Figure 5:
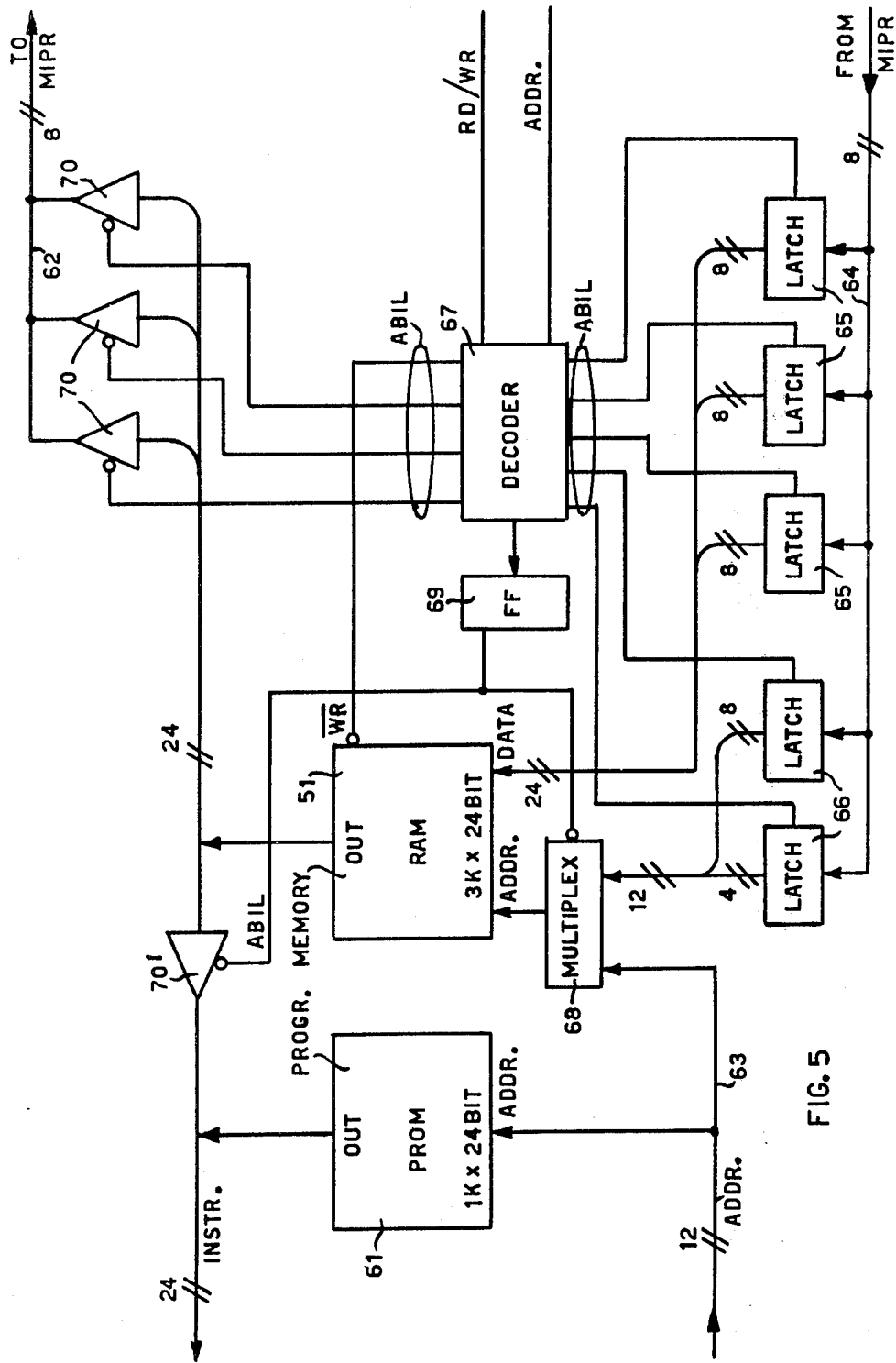
FIG. 5 shows the block diagram of the program memory of the multiplex subsystem of FIG. 2.

The multiplexers MSS 14, 15 and 23 and the interfaces IMA 9 and 10 use the bipolar microprocessor MIPR 30–31 shown in FIG. 4. Although the design of this microprocessor is specialized, it is sufficiently flexible to allow the use of the same logic boards for both the multiplexers 14, 15 and 23 and the interfaces IMA 9 and 10. The most important feature of the bipolar microprocessor is its high data processing speed. This processing speed allows the microprogram management of both the direct communication of the users connection set with the BUS-MUX AU and the direct communication of the central processors 1 and 2 with the I/O-BUS. The program executed by the microprocessor of FIG. 4 is recorded on an LSI type of read/write memory 51, designated as RAM. This program is sent to the MSS 14–23 multiplexers and the IMA 9 and 10 interfaces from the central processors 1 and 2. In order to allow the initial communication between the central processors 1 and 2 and the MSS 14–23 multiplexers, only one RAM 51 "loader" program is recorded on a read only memory PROM 61 which is shown in FIG. 5. As a result, it will be the task of the central processors 1 and 2 to instruct the multiplexer MSS; according to the system installation configuration, with the appropriate program and parameters. This feature of the multiplexers MSS 14–23 and of the interfaces IMA 9 and 10 gives the overall system an unprecedented flexibility which allows, through various configurations of the hardware components of FIG. 1, a wide range of applications. In particular, the system of FIG. 1 may be used for the following applications by appropriately modifying the program of the central processors 1 and 2, the multiplexers MSS 14–23 and the interfaces IMA 9 and 10:

network peripheral switching center;

switched network transit center;
international main center;
terminal concentrator for connection to one or more high level remote data processing centers; and
message switching (i.e., with memorization of messages and subsequent transmitting of same).

The two multiplexers parts MUX A and MUX B are completely equal and each consists of the following modules:

microprocessor 30 or 31 (designated as MIPR A and MIPR B);
data memory 34 or 35;
program memory 51 and 61 (FIGS. 4 and 5);
interface BUS-TB (49 in FIG. 2); and
interface BUS-MUX (50 in FIG. 2).

In the case of the IMA 9 and 10 interfaces, the structure is identical except the BUS-TB interface 49 is changed to a bus interface with the BUS I/O 7-8.

The MIPR microprocessor module shown in FIG. 4 consists of a 12 bit arithmetic unit 52 (ALU 52), a program counter 53 for the 12 bit addressing the memory program 51, and of a logic circuit coordinating all the typical microprocessor functions. In particular, the logic circuit consists of:

an interrupt circuit 54 with at least a 7 level priority for saving information in memory 51 or ALU 52 in the working register 56 and 57 and the status register 55;
real time clock timing circuit 58;
parity check logic 59 consisting of three separate circuits.

The most important functions performed by the MIPR microprocessor are:

possibility of coding subroutines up to 5 levels;
possibility of executing in a single instruction a conditional jump as a result of the test of an addressed single bit;
possibility of executing an indirect type jump;
possibility of executing an indexed type jump on the basis of the contents of the most significant four bits of input data.

The microprocessor of FIG. 4 is capable of carrying out a complete instruction in only one clock period. The clock has a frequency of 4 Mhz which is equivalent to an instruction time of 250 nseconds. This corresponds to a speed of 4 million instructions per second. This feature is fundamental for the switching center design according to the invention. In fact the TDM transmission technique used on the BUS-MUX is feasible only if the MSS 14-23 multiplexer speed is sufficiently high. The architecture of FIG. 1 consequently is also feasible only if it employs very high speed microprocessors. The program memory 51 is addressed by an address of 12 bits for a total of 4K instructions. The instruction field is divided with 1K of instructions recorded on a read only memory PROM 61 for the loader program and 3K of instructions written on RAM 51 memory for the main program. The instruction is contained in a 24 bit word. The most significant bits identify the following four types of instructions:

(A) arithmetic and logic instructions (code 00);
(B) immediate type of instructions (code 01);
(C) input/output instructions (code 10); and
(D) jump instructions (code 11).

The program memory (FIG. 5) consists in 1K × 24 bits of PROM 61 and 3K × 24 bits in RAM 51. The reading and writing of the RAM 51 memory circuit by the microprocessor occurs by transforming the 24 bit instruction into 2 words of 12 bits each. The reading and writing occurs by means of the general registers 57. A parity check bit is added to the 24 bits of the PROM 61 instructions. RAM 51 contains 2 parity bits, one for each of the two words in which the instruction is divided when read or written by the microprocessor. However when the memory is read by the sequence counter 53, that is, when the program which is memorized in it is executed, out of the 3 parity bits, only one bit valid for the instruction bus 62 is generated. The memory is of metal oxide semiconductor type (MOS) with an access time of 200 nseconds. FIG. 5 shows the details of the program memory, including the address register 66, the writing register 65, the decoding logic 67, the address multiplexer 68, the RAM 51 enabling flip-flop 69 and the gates 70 and 70' for reading data and instructions respectively. The address for data memories 34, 35 (FIG. 2) has 12 bits allowing the addressing of 4K words. By adding a bit, if needed, the data memory 34 and 35 may be extended up to 8K words (bank extension).

The address buses 44, the data input bus 40 and the output and data bus 46 shown in FIG. 2 are equipped with a parity check bit. If a parity error is detected by the three parity check circuits 59 (FIG. 4), then priority logic circuit 54 generates an interrupt which starts a diagnostic routine. The modules of memories data 34 and 35 contain a semiconductor type memory RAM used for the compiling of tables and the storing of telegraphic characters. Data memories 34 and 35 of the two MUX A and B parts in which the MSS multiplexer (FIG. 2) is divided, are interlinked (BUS 44 and 45) so that data is written simultaneously in the two memories by either microprocessor 30 or 31 functioning as a master. FIG. 2). The running program check point status is also stored in this memory which allows, at the appropriate master/slave switch time, the restart of the slave's program at the same point in which it was interrupted.

The interface module 49 in FIG. 2 is used to interface the internal bus 62-64 (FIG. 5) with a BUS-TB (140, 150, 230) linked to the AU user connection control groups TB. The tasks of interface modules 49 is to address each users connection set AU, read its status, read the character received, transmit a character, check the calls and instruct the request or the end of the telegraphic connection.

There are two BUS-TBs (A, B) and the interface 49 selects the active bus according to the status of the switch signals on wires 42 and 43 included in the BUS-TB itself and originating from the IMA 9 and 10 interfaces.

The BUS-MUX interface module (50 in FIG. 2) is used to interface the internal bus (62, 64 of FIG. 5) with the MUX-BUS (11-12) which serially links all the MSS 14-23 multiplexers. All communications between the MSS multiplexers themselves and between the MSS multiplexers and the central processor 1 and 2 occur over these buses. There are two BUS-MUX (11 and 12) and the interface module 50 selects the bus according to the signals on the wires 11' and 12' of the BUS-MUX which originate in the IMA 9 and 10 interfaces. Communication on BUS-MUX occurs according to a protocol described in greater detail below. If a request arrives at the MSS multiplexer from the BUS-MUX, this request generates a high level priority interrupt in the microprocessor MIPR 30-31 so as to prompt a rapid reply.

The BUS-I/O interface module (not shown) which is mounted on the IMA 9 and 10 interfaces constitutes the interface to the I/O BUSES of the central processors 1 and 2. It allows communication with the processors 1 and 2 through input/output, direct access to memories 3 and 4 (D.M.A.) and the interrupt. The communication is carried out in order to simultaneously update the memories 3 and 4 of the central processors 1 and 2. Contrary to the BUS-MUX 11-12, out of which only one is considered switched on, this interface must control simultaneously the two I/O BUSES because the two central processors are enabled and process simultaneously the same data. Synchronization is limited to a synchronized circuit using the direct BUS 13. This allows the reciprocal control of both central processors 1 and 2.

The common arbiter logic (ARB 32 of FIG. 2) includes the circuits common to both the microprocessor units 30 and 31 which make up the MSS multiplexers 14-23 or the IMA 9 and 10 interfaces. The arbiter ABB 32 decides which of the MIPR 30 and 31 microprocessor units must be enabled and which is on standby. It receives correct functioning signals from the two microprocessors 30 and 31 and, through its own logic, instructs the microprocessors MIPR 30-31 when to interchange functions. The interchange of functions is carried out in order to avoid considerable discontinuity of operations or, worse still, loss of telegraphic characters. During the interchange of functions of the MIPR 30 and 31, microprocessor activity and that of the connected buses are interrupted by a wait signal. The interchange of functions can also be controlled by the central processors 1 and 2. The arbiter ARB 32 decides which of the microprocessors 30 and 31 is to function on the basis of an efficiency check of two different forms as follows:

(a) a timing circuit (not shown) is provided which is cyclically reset by a software generated signal at predetermined checkpoints in the program. In this way, the activity of the MIPR 30 or 31 is checked, particularly if it is still carrying out the required routines.

(b) a malfunction command is directly issued by the MIPR 30-31 microprocessor if, while executing diagnostic routines, it detects an error which cannot be corrected. Among these types of checks the following may be mentioned: signals parity check; RAM 34 and 35 memories read/write checks; diagnostic calculations, checks on time out limits, and so on.

OPERATION OF THE SYSTEM

The operation of the multiplexer system will now be described. One of the IMA interfaces 9 and 10 acts as a master and scans the various MSS multiplexers 14-23. Initially the IMA interface addresses the first MSS multiplexer 14 and enables it; once switched on, the MSS 14 takes control of the bus and in turn becomes a master. It calls the other MSS multiplexers 15-23 to which it sends the data in its memory. This data is ordered in batches in the memory by the multiplexer MSS to which they are bound; also signals and status are transmitted. The multiplexer MSS requested in a particular time slot by MSS 14, for example MSS 15, sets itself to receive the incoming data and sort it in its memory. At the end of transmission, MSS 14 enables another multiplexer to receive data, and so on until all the data is transmitted. Finally, MSS 14 addresses the IMA interfaces 9 and 10 to set it then for D.M.A. execution with the central processors 1 and 2 and the memories 3 and 4. In this last transmission, all the data bound for the CPU 1 and 2 is sent. At the end of this operation, MSS 14 gives the BUS to the IMA interfaces 9 and 10, which address the MSS 15 multiplexer which in turn becomes the master, and transmits its data in the same way as MSS 14. The scanning continues for all the multiplexers MSS 16-23. Finally, the IMA interfaces 9 and 10 address command the transmission of data from central processors 1 and 2 and memories 3 and 4 to the various multiplexers 14-23, all of which now receive data.

Figure 6:
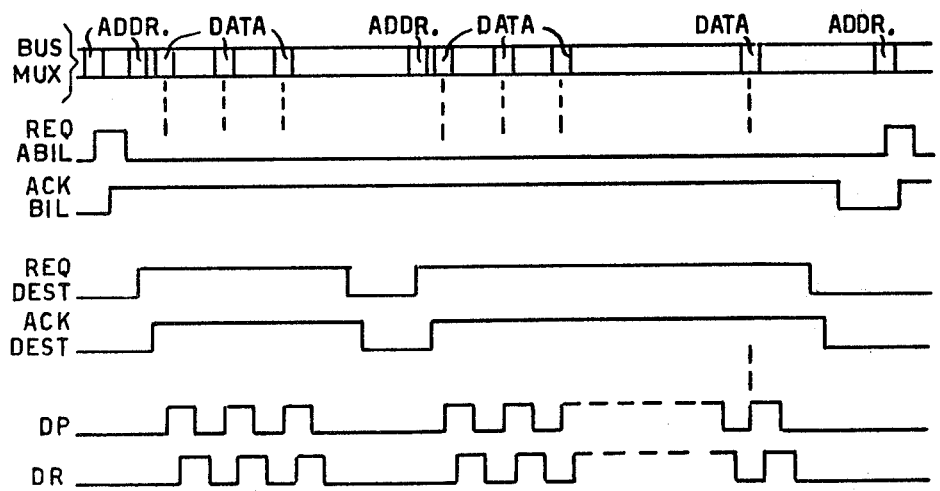
FIG. 6 shows a timing diagram of the signals on the multiplex channel.

The communication on BUS-MUX 11 and 12 is carried out as shown in FIG. 6. There is a 12 bit (plus 1 parity bit) bidirectional data bus on which the character information address and data travel. The other signals synchronize the procedure. The IMA interface 9 puts on BUS-MUX 11 and 12 the address of the required MSS multiplexer 14-23 and generates a signal for the abilitation request (REQABIL). During this phase, together with the appropriate address, a signal is communicated which indicates which buses of the buses BUS-MUX is enabled. The requested multiplexer acknowledges the address by signalling ACKBIL. The IMA resets REQABIL giving the bus to the selected MSS multiplexer so that it may transmit its data. The particular MSS 14-23 multiplexer which is thus enabled (hereinafter called MSS-M) starts the transmission of its data in groups, one group for each multiplexer to which it is bound (hereafter called MSS-D). The multiplexer MSS-M also puts on the bus the MSS-D address and raises the request signal REQUEST. The addressed MSS-D multiplexer replies with an acknowledgement signal and, at this point, starts the data transmission. This "handshaking" procedure is synchronized by D.P. (data ready) and D.R. (data received) signals. At the end of the data transmission, the MSS-M master resets the REQDEST request signal and the MSS-D slave resets the ACKDEST acknowledgement signal.

The MSS-M master then addresses the next MSS-D and so on until completion. The last request is directed to the central processor 1 or 2 for data which is bound for memory 3 or 4 at the end of the scanning cycle. The MSS-M master then issues the ACKBIL signal to indicate to the IMA 9 and 10 interfaces that it has terminated its operation. The interfaces IMA 9 and 10 take control again of the BUS-MUX 11-12 and enable another MSS multiplexer and so on. The whole procedure however is designed in such a way that if the slave does not reply within a fixed maximum time (time-out) to a request from the master, the same sequence is repeated several times, and if the response is always a negative result, a malfunction is signalled.

Figure 7:
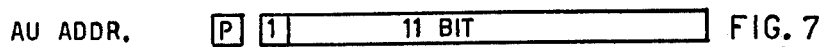
FIG. 7 shows the format of the addresses employed by the multiplex subsystem of FIG. 2.
Figure 8:
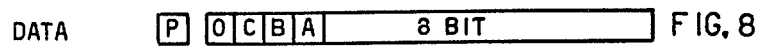
FIG. 8 shows the format of data used by the multiplex subsystem of FIG. 2.

On the BUS-MUX 11-12 the 12 bit data is codified as shown in FIGS. 7 and 8. After the parity bit P, bit 11 (the most significant bit data) divides the BUS-MUX 11-12 bit data into two fields. If bit 11 is one, the following 11 bits represent a user connection set AU address within an MSS 14-23 multiplexer (there are up to 768 user connections for each MSS). If bit 11 is 0, the 8 least significant bits may acquire 5 different meanings according to the CBA coding of the bits with weight 8-10. These meanings are listed in the following table:

Table No. 1

| BIT: | C | B | A | 0-7 bits meaning |
|---|---|---|---|---|
| | 0 | 0 | 0 | Operating code |
| | 0 | 0 | 1 | Character |

Table No. 1-continued

| BIT: | C | B | A | 0-7 bits meaning |
|---|---|---|---|---|
| | 0 | 1 | 0 | Numeric data |
| | 0 | 1 | 1 | MSS multiplexer address |
| | 1 | 0 | 0 | Selection code |

As already mentioned, the MIPX 30-31 bipolar microprocessor may test the four most significant data bits and jump in indexed mode with only one instruction.

The structure of the text transmitted on BUS-MUX (FIG. 9) requires that each word of the text contains in itself the identification or meaning of its function as shown in the above table. A text therefore may be regarded as several transmission batches of homogeneous data. For example, first the telegraphic characters are transmitted, then the MSS 14-23 multiplexer status, then the diagnostic signals and so on. In FIG. 9 a case is shown in which the text is opened by the starting code 71, the address 72 which follows is used by the unit which issues the text to address the receiving unit, in this particular case the MSS A multiplexer. As a result, the data which follows will be destined to the MSS A until the receiving multiplexer address is modified. After this another operating code, 73, follows which identifies the type of data which will be transmitted; data 74 then follows, subdivided into groups for each receiving users connection.

Once all the characters are transmitted, the text may terminate or continue with another code, which signals that the following data represents diagnostic signals and so on. Finally an end of text code 75 appears which terminates the communication.

In one of the first memory areas of the data memories 34-35 of the MSS 14-23 multiplexers a table (not shown) is stored which contains the status of each AU user connection. This table contains information on the user status which is received by the MSS multiplexer during the line scanning operation or transmitted by the central processors 1 and 2. This information includes:
- type of telegraphic procedure (A, B, C or D);
- line transmission speed;
- line status: quiet, call, request, selection, connection and so on;
- connection request with distortion measuring set (not shown);
- DER status (out of order);
- selection type (disk or keyboard);
- user address of data received from an AU;
- buffer counter of data received by the central processors 1 and 2; and
- time-out management.

A second part of the data memories 34-35 contains the sequence of characters which is exchanged with the peripherals. This second part contains two memory areas: one area (shown in FIG. 10) is reserved for the sorting of the characters arriving from the user connections AU so that they may then be sent in the most suitable way on BUS-MUX 11 and 12. The other is reserved for receiving from the BUS-MUX 11 and 12 the characters which must subsequently be sent to the various user connections AU. In order to optimize transmission time, these characters are sorted into groups, one for each MSS 14-23 receiving multiplexer, or for each user connection AU. FIG. 10 shows how data memories 34-35 are organized for collection of data originating from the AU user connections. Initially the AU (1-5) addresses are written sequentially, so that they are ready to receive data from the remote users through connected telegraphic lines. At this point the MSS multiplexer reads the first address 81 and writes it in the first free memory position. The MSS checks the addressed AU to see if it has any data to be read. If this data is ready, it is read and recorded sequentially in memory. The second address 82 is read and a similar check is carried out to see if the corresponding AU has data ready to be sent, and so on, for all the previously recorded addresses. A complete scanning of all the enabled AUs is therefore achieved. Subsequently new characters are inserted in the text. The scanning operation must occur within the maximum time limit of data transmission of the speediest telegraphic lines of the multiplexer system. In this way, a roll-up memory is obtained which increases its data content each time and which is also capable of adapting to the different data transmission speeds. When a request arrives from IMA 9-10 interface to transmit data on the BUS-MUX 11-12 the MIPR 30-31 microprocessor stops the AU scanning and outputs the contents of the data memories 34-35 in the same sequence as received.

During transmission, the addresses of the transmitting user connections AU are replaced by the addresses of the receiving user connections AU, according to the table recorded in the first part of the data memories 34-35. Characters are already sorted in groups for each MSS-D multiplexer because the initial address sorting was carried out to satisfy these conditions.

Figure 11:
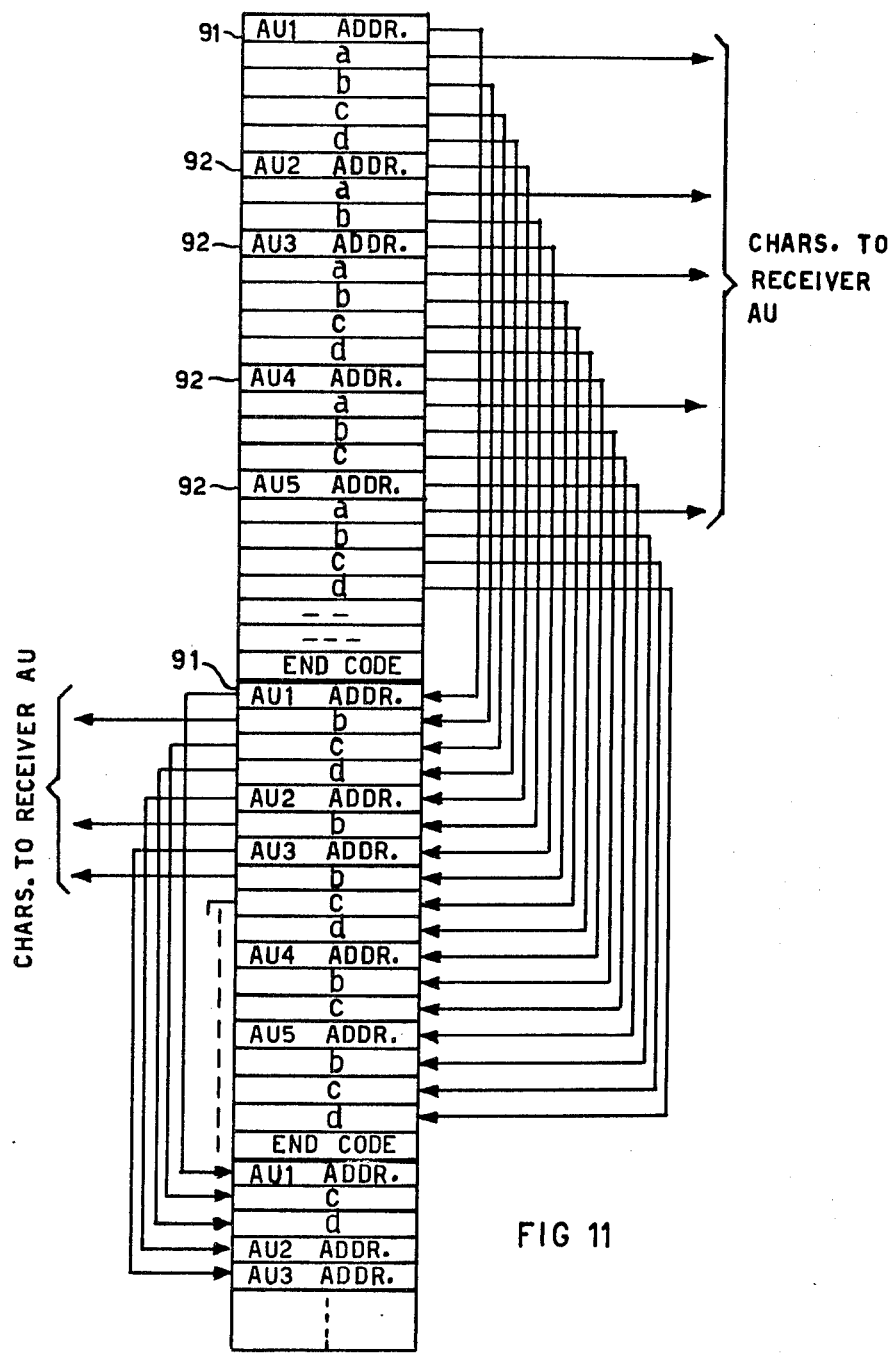

As far as the switching of the input data is concerned to the various user connections AU, the memory organization is similar to that of FIG. 9 as shown in FIG. 11. Data received from BUS-MUX 11-12 is directly transferred to the data memories 34-35. This data consists of the receiver address followed by several characters. The scanning occurs as follows: the MUX-M master reads the first receiving user address 91 and checks if this AU is free for data transmission of one character (SERPAR 27 transmission buffer is empty); it then transfers the address 91 down in the first free zone of data memories 34-35. If the character cannot be transmitted to the receiving AU it is rewritten in the memory below the address previously transferred. This procedure continues for all the user connections AU having address 92 in the text. At each cycle the data contents diminish until exhaustion. If during this cycle new messages arrive, they are temporarily recorded in another area of data memories 34-35 to be placed at the end of the cycle in the queue after the preceding text. This is done to grant strict data transmission sequence to the user connection AU.

As far as direct data exchange between two MSS 14-23 multiplexers is concerned, no particular synchronization problems are foreseen. This is because the speed of the data receiving line is equal to that of transmission.

Transmission of data from the central processors 1 and 2 to the user connections AU, unlike transmission of data between two multiplexers MSS, requires synchronization between the central processor output and the telegraphic lines. The following operations are therefore required. For each AU which must transmit the characters, a buffer of N characters is generated in the memory. When the buffer reaches N/2, the multiplexer prepares a data request to the central processor 1-2; this request is transmitted at the end of the processor bound transmission. Central processors 1-2, after having received the request, prepare the data output, taking from the message recorded in its memories 3-4 the first N/2 characters. This operation ensures stable functioning at the maximum speed allowed by the telegraphic lines. As already mentioned, in the users connection status table of the MSS 14-23 multiplexers there is a character buffer counter for the data received from the central processor. This counter increases as data arrives and decreases when it is sent to the AU users attachment for online transmission.

ORGANIZATION OF THE COMMUNICATIONS WITHIN THE IMA INTERFACE AND CPU 1 AND 2

The IMA 9-10 interfaces and the central processors 1-2 communicate both through the D.M.A. for direct data and message transfer to and from the MSS 14-23 multiplexers, and through the input/output system for reciprocal exchange of status and commands.

The central processors 1-2 communicate the following information, which is necessary for the D.M.A. management, to the interfaces 9-10:

length and initial address of message which must be read by memories 3 and 4; and maximum length and initial address of message to be written in memories 3 and 4.

When the IMA 9-10 interfaces managing the D.M.A. reach zero, that is, when the message from the data processor 1-2 is finished or the memory area reserved for the input of external messages is filled, it sends an interrupt to the CPU 1-2 to inform it of the outcome of the operation and allow a status update. A status register 55 (FIG. 4) of the IMA 9-10 interfaces allows the CPU 1-2 to read its situation at any time. This register summarizes the status also greater detail can be achieved with additional parameters that the the central processors 1-2 can request from the IMA 9-10 interfaces. Each emergency situation results in the transmission of an interrupt to the processor. The processors 1-2 must communicate to the IMA 9-10 interfaces the number of the MSS 14-23 multiplexers connected to the BUS-MUX 11-12 so that the interface may carry out the scanning correctly. The central processors 1-2 also inform the IMA 9-10 interfaces which of the two processors 1 or 2 exercising control. If it is not possible to determine which of the two is exercising control, the IMA 9-10 interfaces make their own judgement by examining the results of diagnostic routines processed by both central processors. Different types of data may be transmitted by one MSS 14-23 multiplexer to another MSS multiplexer or to the central processors 1-2. These different types of data may be grouped as follows:

(a) data bound to other MSS multiplexers;
(b) data bound to central processors 1-2;
(c) other types of information for central processors 1-2, namely:
   AU users attachment status — enabled, disabled, out of order;
   character requests for transmission buffer;
   status of MSS multiplexer itself; and
   diagnostic messages.

Data which the central processors 1-2 may transmit to the MSS multiplexers is as follows:

(a) character:
(b) instructions and signals concerning:
   user table updating; and
   Various signals;

(c) initial program loading in memories 51 of the MSS 14-23 multiplexers. This loading is also carried out for the IMA 9-10 interfaces.

MANAGEMENT OF THE USER CONNECTION LINKAGE

The MSS 14-23 multiplexers cyclically scan the stand by user connections AU to determine if there are incoming calls on the telegraphic lines. If there is a call, the one of MSS multiplexers notifies the central processors 1-2 and invites the user connection AU make a selection. The multiplexer MSS sets itself to receive the selection characters. The selection input may be either from disk or from keyboard. In either event, the particular MSS 14-23 multiplexer procedes to translate the incoming selection pulses into binary digits which are sent to the central processors 1-2. The particular MSS multiplexer does not carry out any particular validity checks on these digits. The central processors 1-2, after having received the selection digits, check the memories 3-4 for the status of the receiving user connection. Consequently, the central processors make the following decisions.

(a) If the receiving user connection is free and accepts the communication, the central processor 1-2 instructs the MSS 14-23 multiplexers to activate the corresponding user connection AU and to set it for the reception of data sent by the calling user.

At the same time the processor informs the caller's particular MSS multiplexer as to the message receiving user connection AU and orders the linkage.

(b) If the receiving user connection AU cannot receive the message, the processor may decide either to reply negatively to the calling user connection AU or to receive the message itself and record it on one of its mass memories (e.g. the disk). In the first case the processor sends to the connection user's MSS 14-23 multiplexer a brief closing message, case accompanied by the closure reasons; in the second case it carries out the linkage.

After the linkage, data is directly transmitted by the user's MSS 14-23 multiplexer, without direct intervention of the central processor. At the end of the transmitted message the calling user connection AU sends an end of message signal. The MSS 14-23 multiplexer interprets the end message and transmits an end of linkage connection code to the central processor 1-2. The central processor sends an end of linkage connection code to the receiving user connection AU, calculates the tariff and sends it to the calling user connection AU. Finally it transmits to the caller's MSS multiplexer an end of connection code. The multiplexers of the calling and receiving user connections AU translate the end of connection code into the corresponding telegraphic signal and send it to the calling and receiving users through the respective AU user connections.

SECURITY CRITERIA AND MANAGEMENT OF THE DIAGNOSTIC MESSAGES

The whole multiplexer system is designed for maximum fail safe security. For this reason all the circuits are doubled and equipped with automatic checks of abnormal situations. The system is designed so that in case of failure the reserve unit starts operating immediately, avoiding any interruption of functions (e.g., central processors 1-2, IMA interfaces 9-10, MSS 14-23 multiplexer MIPR microprocessors BUS-TB (A), (B), and BUS-MUX 11-12). This is made possible because the reserve unit stores the updated situation in its own memory as it is at the moment of the failure in the active unit. The doubling of all the circuits is done in such a way that any element of the chain may be switched independently. The management of this system requires a complete organization as far as hardware failure detection and signals are concerned so that this type of information does not in turn create malfunctioning of the overall system. The MSS 14-23 multiplexer failure can be detected either by the failed multiplexer itself, by another multiplexer or by the IMA 9-10 interfaces (for example, no reply in case of calls). The no reply is signalled to the IMA 9-10 interfaces which can independently verify that the MSS multiplexer involved is actually faulty. In this case, the interfaces IMA 9-10 may instruct the function switch of the MIPR 30-31 microprocessors if this has not already been carried out. If the multiplexer itself succeeds in detecting its own fault, it operates the microprocessor function switch and thereafter informs the IMA 9-10 interfaces. The IMA 9-10 interfaces also perform the task of deciding which of the BUS-MUX 11-12 must be active and instruct the function switch in case one of them fails. The IMA 9-10 interfaces are in turn monitored either by their ARB 22 arbiter circuit or by the central processors 1-2 through the I/O BUS 7-8. The IMA 9-10 interfaces may also act as a judge in the case of conflicting decisions resulting from the failure of one of the central processors 1-2. When a function switch operates within an MSS 14-23 multiplexer or in the IMA 9-10 interface, the faulty unit does not affect the functioning of the overall system. In addition its logic boards may be extracted for repair from the container without any effect on the active unit. When the repaired board is put back in its place, the central processors 1-2 carry out the reloading of the MIPR 30-31 microprocessor program in memory 51 (FIG. 4). The faulty MSS 14-23 multiplexer stops all the users new calls until all the communications being handled are completed; this allows the data memory 34 or 35 which has just been put back to update itself by copying data from the active memory data.

The multiprocessor switching center has been described herein in a simplified manner only to clarify the concept of the invention. Naturally, technicians in this field may carry out modifications and variations with the technology available without exceeding the limits and the spirit of the invention.

We claim:

1. An automatic switching multiprocessor center for telegraphic lines operative according to the time division multiplex (TDM) technique, comprising:
   a plurality of programable multiplex subsystems, each connected to a plurality of telegraphic lines connecting remote users;
   a programable multiplex system;
   a multiplex bus serially connecting said programable multiplex system and said plurality of programable multiplex subsystems;
   said programable multiplex subsystems comprising transmission means for transmitting on said multiplex bus the information and checking characters of the messages which are exchanged by said remote users, without the intervention of said programable multiplex system, wherein said programable multiplex system transmits the commands and the data necessary for the overall functioning of said multiprocessor center to said subsystem through said multiplex bus.

2. Multiprocessor system according to claim 1, said programable multiplex system including two digital computing sets each comprising:
   a miniprocessor;
   a set of input/output peripheral units;
   a central memory; and
   an interface processor having a local memory, wherein said miniprocessor initialises the multiprocessor system by loading in said central memory, in said local memory of said interface processor and in said programable multiplex subsystems, the programs and the microprograms read by a predetermined unit of said peripheral units and necessary for the functioning of the overall system.

3. Multiprocessor system according to claim 2, said programable multiplex system further comprising,
   an input/output bus for each digital computing set, said input/output bus connecting said miniprocessor, said set of peripheral units, said central memory and said interface processor to permit the transfer of information characters between each other, said miniprocessor processing at any given time the same program using the same set of data, said interface processors receiving at any given time the same information characters from the respective miniprocessor;
   efficiency control means in said interface processor to verify at preselected time intervals the efficiency of the signals received from the respective miniprocessors through said input/output bus; and
   selection means controlled by said efficiency control means for selecting one of said miniprocessors to transfer the information characters on said multiplex bus.

4. Multiprocessor system according to claim 2 in which said programable multiplex subsystems and said interface processor each comprises:
   a couple of high speed microprocessors; and
   an arbitrating logic which may be controlled either by said multiplex system or by the efficiency signal generated by said microprocessor to selectively activate one or the other microprocessors of said couple in the event one of the microprocessors of said couple fails.

5. Multiprocessor system according to claim 2 in which said interface processor of said multiplex system and said multiplex subsystems each comprises:
   an interface logic associated with said multiplex bus, said multiplex bus comprising a couple of identical physical buses, said interface logic being controllable by the respective multiplex subsystems or by said interface processor to selectively activate one or the other physical buses of said multiplex bus, whereby the failure of one of the two physical buses conditions said interface logic of said multiplex bus to activate the remaining physical bus of said couple.

6. Multiprocessor system according to claim 4 in which each of said programable multiplex subsystems comprises:
   a plurality of group controllers each respectively controlling a group of said plurality of telegraphic lines,
   said group controllers being serially connected between themselves and to said couple of microprocessors through a couple of group buses to transfer the command and information characters amongst the group controllers, said programmable multiplex subsystems also comprising:

a group interface logic to selectively enable a first or second bus, whereby the failure of one of the two buses of said couple of group buses forces said group interface logic to enable the remaining functioning group bus.

7. Multiprocessor system for the automatic switching of telegraphic lines through the time division multiplex technique (TDM) comprising:

a plurality of telgraphic lines divided into groups and linking remote users, each group of lines being connected to an associated group controller, said group controller generating several working telegraphic frequencies and being connected to a corresponding multiplex processor to control the transmission of data signals on a plurality of group buses linking said group controllers between themselves and to said multiplex processor;

a multiplex bus linking said multiplex processors between themselves and an interface processor designated to control the transmission of data on said multiplex bus;

a central processor controlling the initial, final and special operations concerning the communication between two users connected to said telegraphic lines, and to control the overall functioning of said system, said central processor being connected to said interface processor through an input/output bus, wherein said interface processor sequentially transfers the control of said multiplex bus to each of said multiplex processors and to said central processor thus allowing the transfer of messages between said users of said lines through said multiplex controller with the TDM technique and without intervention of said central processor.

8. Multiprocessor system according to claim 7 in which said multiplex processors and said interface processors comprise:

a couple of identical microprocessors having high speed instruction execution, each comprising a program memory, wherein said central processor, during initialization, phase loads in said program memory of said multiplex processor a first group of programs defining a first set of functions specifying the work of said multiplex processors and said central processor loads in said program memory of said interface processor a second group of programs defining a second set of functions specifying the work of said interface processor.

9. Multiprocessor system according to claim 8 in which said multiplex processors and said interface processor also comprise:

a common arbitrating logic, said group of microprocessors being equipped with efficiency means to periodically send efficiency signals to said common arbitrating logic, said common arbitrating logic being responsive to said efficiency signal for selectively generating a first signal activating a first microprocessor of said couple of microprocessors and a second signal activating a second microprocessor of said couple.

10. Multiprocessor system according to claim 9 in which said couple of microprocessors of said multiplex processor and of said interface processor each comprises:

a data memory, said data memories being simultaneously written by said first or by said second microprocessor of said couple, wherein said common arbitrating logic selectively enables said first and said second microprocessor to write in said memories through said first signal or through said second signal.

11. Multiprocessor system according to claim 9 in which said multiplex processor and said interface processor each comprises;

two power supply units to supply power to said first and said second microprocessor of said couple respectively, said common arbitrating logic being supplied by the logic OR of said power supplies, said common logic being controlled by said efficiency signal to disable the functioning of said microprocessor associated with said non-functioning power supply, whereby the failure of one of said power supply units does not stop the functioning of said common logic nor that of said multiplex processors and of said interface processor.

12. Multiprocessor system according to claim 9 in which said efficiency means comprises:

parity control means to verify at any moment if the information consisting of instructions, data and addresses processed by said microprocessor has parity errors and to generate said efficiency signal when no parity error has been detected.

13. Multiprocessor system according to claim 8 in which said microprocessor comprises:

a program memory which includes a first read only memory and a second read write memory, wherein said read only memory contains a prerecorded program which may be automatically started at system initialization to instruct said microprocessor to load the work programs in said read write memory which are sent by said central processor to said multiplex processor and to said interface processor.

14. In a multiprocessor system for the automatic switching of telegraphic lines through the time division multiplex technique (TDM), said multiprocessor system including a plurality of programable multiplex subsystems each connected to a plurality of remote users through telegraphic lines, a programable multiplex system, an interface processor connected to said programable multiplex system, a multiplex bus serially linking said subsystems to said interface processor; a method allowing said interface processor to select one of said multiplex subsystems comprising of the steps of:

generating in said interface processor a first address representing a first programable multiplex subsystem of said plurality and a first arbitration request signal;

transmitting on said multiplex bus said first address and said first request signal;

receiving in said first programable multiplex subsystem said first address and said first request signal;

generating in said first programable multiplex subsystem a first reception acknowledgment signal;

transmitting on said multiplex bus said reception acknowledgment signal;

receiving in said interface processor said first reception acknowledgment signal;

resetting in said interface processor said first request signal; and detecting in said first programable multiplex subsystem said first reset request signal.

15. Method as in claim 14 for further allowing said first multiplex subsystem to select a second multiplex subsystem through the following steps:

generating in said first programable multiplex subsystem a second address representing a second programable multiplex subsystem of said plurality and a second request signal;

transmitting on said multiplex bus said second address and said second request signal;

receiving in said second programable multiplex subsystem said second address and said second request signal;

generating in said second programable multiplex subsystem a second reception acknowledgement signal;

transmitting on said multiplex bus said reception acknowledgement signal.

16. Method as in claim 14 for further transmitting from said first multiplex subsystem on said multiplex bus an ordered set of information characters to said second multiplex subsystem through the following steps:

generating in said first programable multiplex subsystem an information character and a character ready signal;

transmitting on said multiplex bus said character and said character ready signal;

receiving in said second programable multiplex subsystem said character and said character ready signal;

generating in said second programable multiplex subsystem a character reception acknowledgement signal;

transmitting on said multiplex bus said character reception acknowledgement signal;

resetting in said first programable multiplex subsystem said character ready signal;

detecting in said second programable multiplex subsystem said character ready reset signal;

resetting in said second programable multiplex subsystem said character reception acknowledgement signal; and transmitting to said second programable multiplex subsystem the remaining characters of said set repeating sequentially the above steps.

17. Method as in claim 16 for further resetting in said first and said second multiplex subsystems said request and said reception acknowledgement signals comprising the following steps:

detecting in said first programable multiplex subsystem the last character reception acknowledgement signal reset by said second programable multiplex subsystem;

resetting in said first programable multiplex subsystem said second request signal;

detecting in said second programable multiplex subsystem said second reset request signal;

resetting in said second programable multiplex subsystem the second acknowledgement signal.

18. Method as in claim 17 for further generating in said interface processor a new request signal directed to a multiplex subsystem of said plurality comprising the following steps:

detecting in said first programable multiplex subsystem the reset of said second acknowledgement signal in said second programable multiplex subsystem;

resetting in said first programable multiplex subsystem of said first acknowledgement signal;

generating in said interface processor a request signal and and address representing one of said multiplex subsystems of said plurality.

* * * * *